(12) United States Patent
O'Leary et al.

(10) Patent No.: US 6,326,596 B1
(45) Date of Patent: Dec. 4, 2001

(54) SYSTEMS AND METHODS FOR CONTROLLING POWER APPLIED TO A RESISTOR ARRAY

(75) Inventors: Kenneth P. O'Leary, Cumberland, RI (US); Sheldon M. Carr, West Bend, WI (US)

(73) Assignee: Cara Incorporated, Warwick, RI (US)

( * ) Notice: Subject to any disclaimer, the term of this patent is extended or adjusted under 35 U.S.C. 154(b) by 0 days.

(21) Appl. No.: 09/431,653

(22) Filed: Nov. 1, 1999

Related U.S. Application Data
(60) Provisional application No. 60/106,738, filed on Nov. 2, 1998.

(51) Int. Cl.[7] .................................................... H05B 1/02
(52) U.S. Cl. ........................... 219/492; 219/489; 219/528
(58) Field of Search ........................... 219/492, 482–491, 219/506, 501, 528

(56) References Cited

U.S. PATENT DOCUMENTS

| | | | |
|---|---|---|---|
| 4,158,432 | * 6/1979 | Van Bavel | 219/506 |
| 4,744,359 | * 5/1988 | Hatta et al. | 219/497 |
| 5,079,410 | * 1/1992 | Payne et al. | 219/506 |
| 5,079,784 | * 1/1992 | Rist et al. | 219/492 |
| 5,420,397 | * 5/1995 | Weiss et al. | 219/501 |
| 5,802,957 | * 9/1998 | Wanat et al. | 219/492 |
| 6,153,858 | * 11/2000 | Barnes et al. | 219/413 |

* cited by examiner

*Primary Examiner*—Tu Ba Hoang
(74) *Attorney, Agent, or Firm*—Foley, Hoag & Eliot LLP

(57) ABSTRACT

A system for controlling power applied to a resistor array within a heating pad is provided. The system includes a power supply for connecting the system to a power source, a resistor array positioned within a heating pad for generating heat based on a selected heat level, and a control unit for determining the level of heat to be generated and the duration of time power is applied to the resistor array. In an embodiment, the control unit includes a timing device for generating one of an initial set time period and a shortened time period, at the expiration of either of which the supply of power to the system is terminated. The control unit further includes a mechanism which can initiate the shortened time period in place of the initial set time period. The mechanism may be used to reset the shortened time period to its full duration, after an elapsed period, each time the mechanism is activated. The control unit further includes an input mechanism for selecting an amount of heat to be output by the heating pad.

33 Claims, 5 Drawing Sheets

SYSTEMS AND METHODS FOR CONTROLLING POWER APPLIED TO A RESISTOR ARRAY

RELATED U.S. APPLICATION(S)

The present application claims priority to U.S. Provisional Patent Application Ser. No. 60/106,738, filed Nov. 2, 1998, which application is hereby incorporated herein by reference.

TECHNICAL FIELD

The present invention relates to systems and methods for controlling voltage and power applied to a resistor array, and in particular to a resistor array capable of being used with a heating pad, such as that used for medical and/or therapeutic purposes.

BACKGROUND ART

Heating pads have been in use for some time for medical and/or therapeutic purposes. Specifically, the heat supplied from the pads have been used to warm body parts, and in particular muscle areas, to relieve such areas from the aches and pains associated therewith.

To maintain a substantially constant heat level over an extended period of time, heating pads have utilized electrical power to generate a source of heat by way of a resistor array. In some designs, the heating pads are provided with mechanisms for controlling (hereinafter "control units") the amount of power to the resistor array, so as to vary the level of heat generated. With such control units, the duration of power supplied to the heating pad is often continuous, thus resulting in a continuous generation of heat by the pad. To avoid continuous generation of heat, or at least until the heating pad is disconnected from a power source, such as an outlet, some control units have employed the use of a timer to cut off the supply of power to the resistor array, after a preset amount of time. In this manner, the control unit can determine the duration over which heat is generated from the pad.

Despite having a timer, there are some disadvantages associated with currently available heating pads. Specifically, the timers available with current heating pads are often designed with just one setting, usually for a duration of about sixty minutes. Thus, should the heat pad user wishes to stop using the heating pad prior to the expiration of the preset time period, the user may be inconvenienced by being forced to unplug the electrical chord which connects the heating pad to an electrical outlet in order to stop the supply of power to the heating pad. Subsequently, to initiate another use session, the user must remember to re-plug the electrical chord into the outlet prior to getting comfortable. Otherwise, the user must move from his comfortable arrangement to plug the electrical chord into the outlet.

The design of existing control units may also create potential hazards. In particular, should the user neglect to unplug the electrical chord from the outlet prior to moving away from the heating pad area for an extended period of time, the continuous supply of power to the heating pad, or at least for the duration of the timer period, without any supervision from the user may cause an accidental fire to be started. Moreover, the continuous supply of power to the heating pad without the use of same by the user would result in a waste of energy and thus money.

Accordingly, it would be desirable to provide a control unit which permits the user to vary the time period during which power is supplied to the heating pad. Furthermore, it would be desirable to provide the user with an option for a time period shorter than that currently available, so as to avoid any potential hazards, waste of energy, or frequent plugging and unplugging of the electrical chord from the outlet.

SUMMARY OF THE INVENTION

The present invention, in accordance with one embodiment, is directed to a system for controlling power to a resistor array in a heating pad. The system includes a power supply for connection to a power source and a resistor array positioned within a heating pad for generating heat based on a selected heat level. The system also includes a control unit connecting the power supply to the resistor array. The control unit, in an embodiment, includes a timer device for generating one of an initial set time period and a shortened time period during either of which period power is supplied to the system. The timer device is designed so that at the expiration of the initial set time period or the shortened time period, the supply of power from the power supply is automatically terminated. In connection with the timer device, a mechanism is provided which can initiate the shortened time period in place of the initial set time period. The mechanism may be used to reset the shortened time period to its full duration, after an elapsed period, each time the mechanism is activated. The control unit further includes an input mechanism for selecting an amount of heat to be output by the heating pad. The input mechanism for selecting the amount of heat can be a plurality of buttons, each representing a different level of heat output, or alternatively be a sliding element for selection of different levels of heat output. When the input mechanism is a sliding element, the control unit may be provided with a mechanism to initiate the supply of power to the system. The control unit preferably includes a microprocessor for controlling the duration and supply of power to the resistor array.

DETAILED DESCRIPTION OF SPECIFIC EMBODIMENTS

Figure 1:
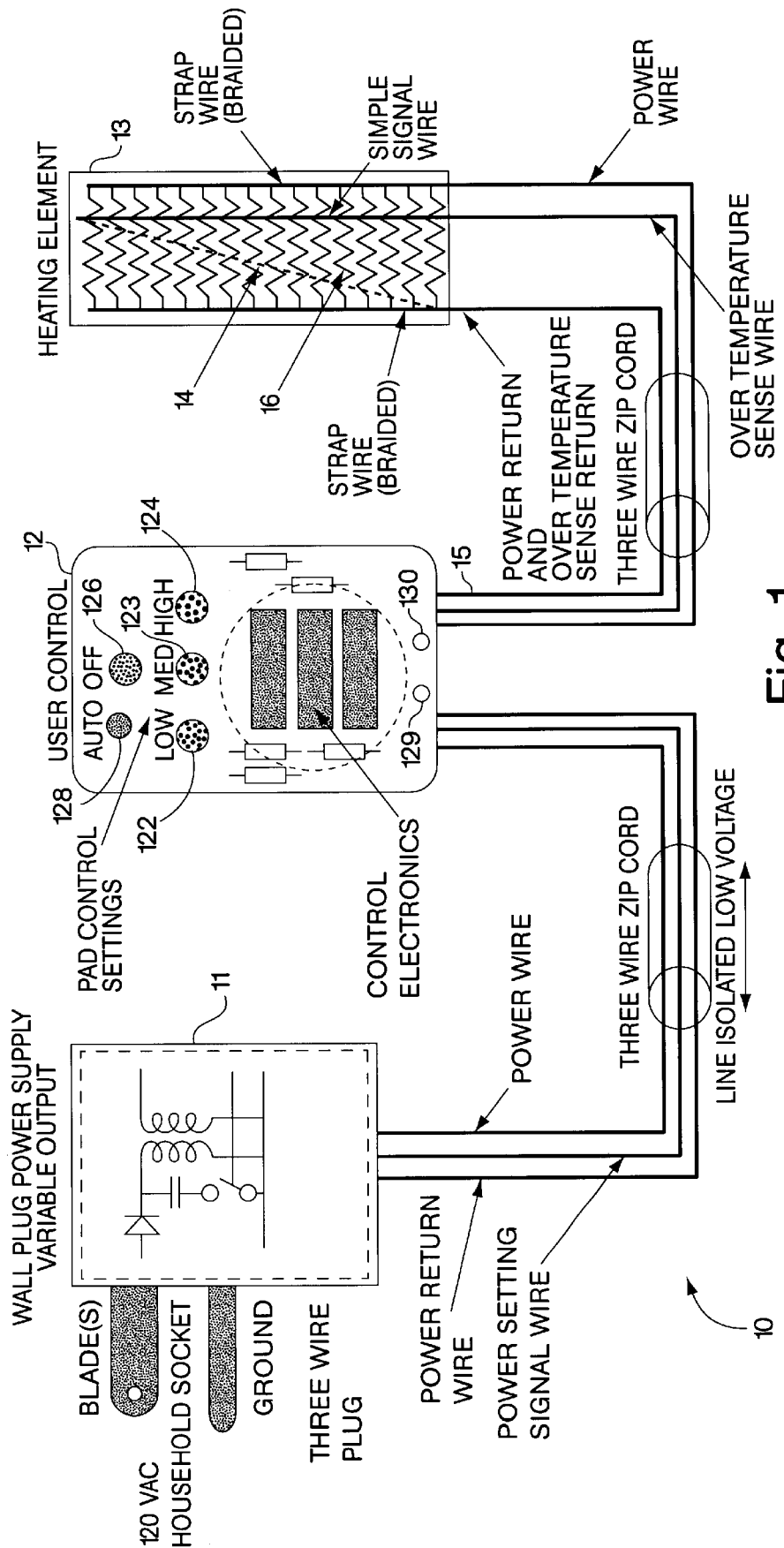
FIG. 1 illustrates a schematic diagram directed to a system for controlling power supply to a resistor array, in accordance with one embodiment of the invention.

In FIG. 1, a system 10 is provided for controlling the amount of voltage, and hence, the power applied to a resistor array 13. The system 10 of FIG. 1 is preferably adapted for use with a heating pad to provide heat to a localized portion of, for instance, a human body for medical and/or therapeutic purposes. However, to those who are skilled in the art reading the application, the system, of course, may be adapted and/or modified to have other applications.

The system of FIG. 1 includes a line voltage power supply 11, adapted to provide a selected voltage output corresponding to a selected heat output. The power supply 11, in one embodiment, is connected to a control unit 12 by way of an electrically conductive chord 15. The control unit 12, as shown in FIG. 1, includes buttons 122, 123 and 124 designed to permit user selection of heat output from the system 10, for instance, low (122), medium (123) or high (124) heat output. By pushing one of the buttons 122–124, specific input signals corresponding to the pushed button are transmitted to the power supply 11 to select the appropriate voltage output that correspond to the input signals from the pushed button. It should be appreciated that, in one embodiment of the invention, when any one of the buttons 122–124 is pushed, the system is turned "ON" to permit a supply of power to flow to the system 10 from a power source, such as an electrical outlet, through the power supply 11. As will be discussed hereinafter in further detail, when the system 10 is turned "ON", an automatic timing mechanism is activated to initiate an initial set time period, for instance sixty minutes, after which the system is turned "OFF" to terminate the supply of power to the system 10. As it may be desirable to turn the system 10 to "OFF" prior to the expiration of the initial set time period, the control unit 12 may include an "OFF" button 126, which may be pushed at any time during the course of the initial set time period to terminate the supply of power to the system 10.

The control unit 12, in one embodiment includes an "AUTO" button 128, which when pushed overrides the initial set time period of the automatic timing mechanism and shortens the timing duration after which the power supply to the system 10 is terminated to turn the system 10 to "OFF". In an embodiment of the invention, the "AUTO" button 128 is designed so that every time it is pushed the shortened time period is set to approximately twenty minutes. Thus, if during the initial set time period, the "AUTO" button 128 is pushed, the system is set to turn "OFF" after twenty minutes. If during the duration of the shortened time period, the "AUTO" button 128 is again pushed, the shortened time period is reset to twenty minutes after which power supply to the system 10 is terminated. It should be understood that although twenty minutes is the preferred period, the shortened time period can be designed with any desirable duration.

The system 10 of FIG. 1 also includes heating pad 13 for providing heat to a localized area on the user. In one embodiment, the heating pad 13 includes a resistor array 16 for generating heat output. The resistor array 16 can be heat generating wires made from, for example, nickel-chromium, carbon, steel, or other conductive metals. The resistor array 16 may also be manufactured from carbon cloth or carbon fibers. In one embodiment, the heating may include a Positive Temperature Co-Efficient (PTC) wire 14, designed to provide feed back to the control unit 12, so that, for example, in the event of an over temperature condition or localized hot spot, the control unit 12 can shut the system 10 off. Both the resistor array 16 and the PTC wire 14 are known in the art and are available commercially. The system 10 further includes an electrically conductive chord 15 connecting the power supply 11, the control unit 12 and the fiber pad 13. Although the power supply 11 is illustrated in FIG. 1 as an external and separate feature from the control unit 12, the present invention contemplates a design wherein the power supply 11 is provided as an internal unit within the control unit 12.

Figure 2:
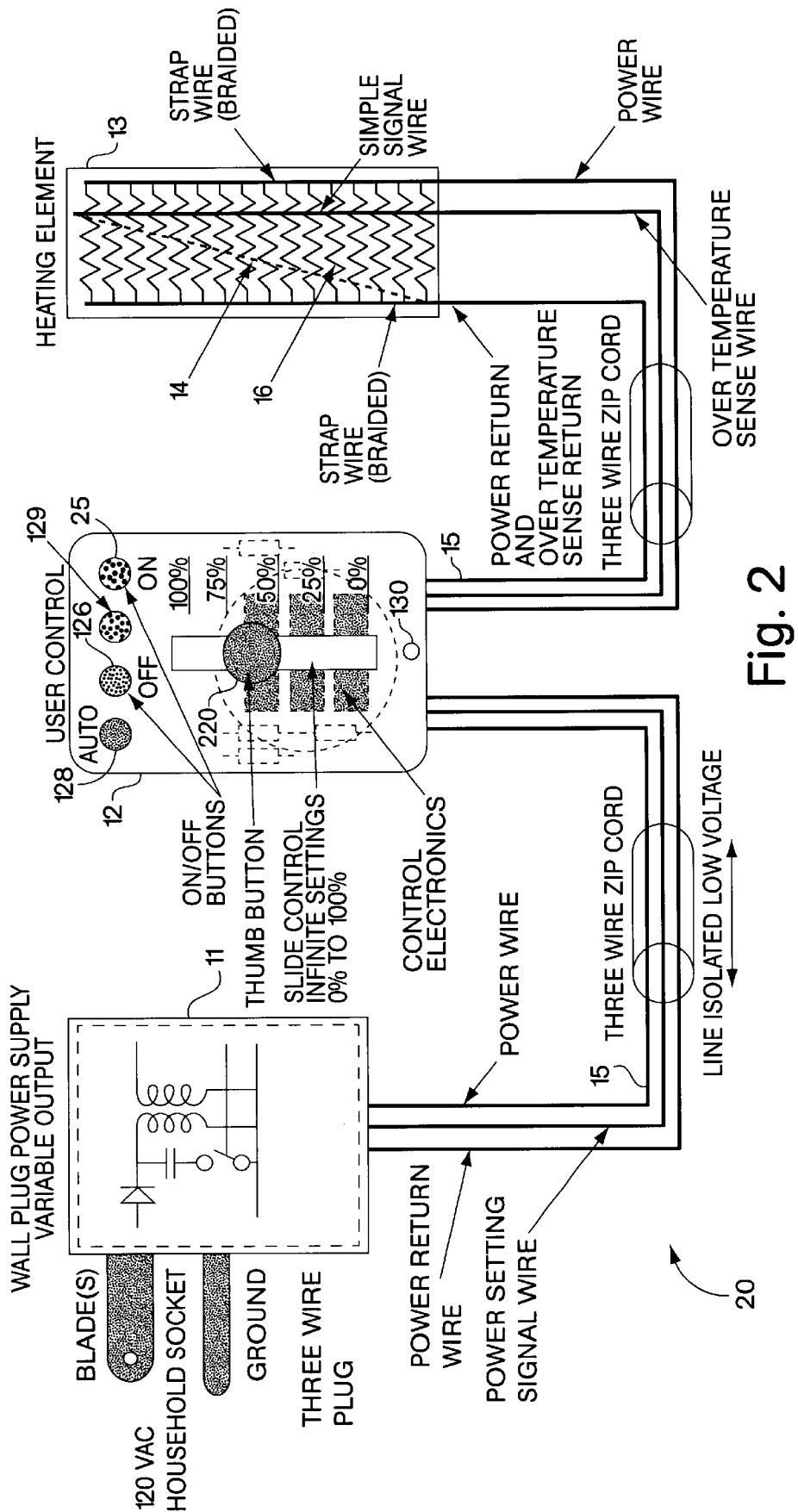
FIG. 2 illustrates, in an alternate embodiment of the invention, a schematic diagram directed to a system for controlling the amount of power applied to a resistor array.

In FIG. 2, an alternate embodiment of the system 10 in FIG. 1 is illustrated. System 20 of FIG. 2, is substantially similar to the system 10 in FIG. 1, and includes a power supply 21, a control unit 22, and a fiber pad 23. However, unlike the system 10 in FIG. 1, the system 20 in FIG. 2 provides the control unit 22 with a sliding element 220 instead of buttons 120 to permit user control of the heat output. The system 20 further includes an "ON" button 25 to permit the initiation of power supply to the system 20.

Figure 3:
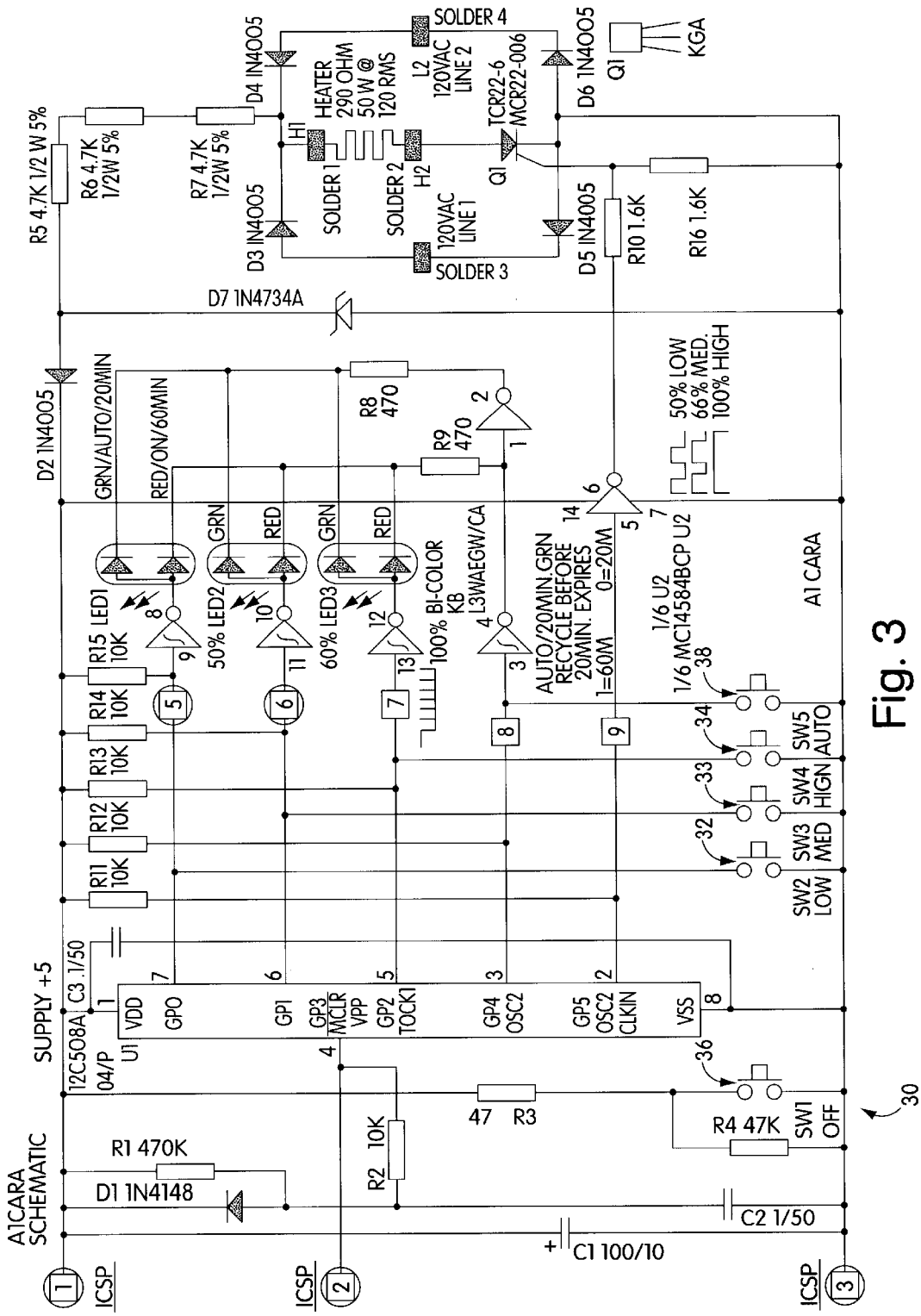
FIG. 3 illustrates a schematic diagram of a microprocessor for use in connection with the present invention.

Looking now at FIG. 3, a schematic diagram of a microprocessor 30 for use in connection with either of the control units of FIGS. 1 and 2 is illustrated in accordance with one embodiment of the present invention. It should be appreciated that although reference is now made to control unit 12, the microprocessor 30 is similarly adaptable for use with control unit 22 of FIG. 2. The microprocessor 30, as shown in FIG. 3, includes switches 32, 33 and 34. The switches are designed, in an embodiment, to open and close to control the amount (i.e., level) of heat generated in the resistor array 13. For example, when switch 32 is activated, such as by pushing button 122 on control unit 12, the amount of heat that is generated by the resistor array 13 is relatively "low". Low heat is generated when the power transmitted to through switch 32 is permitted to be on (i.e., in the closed position) at approximately fifty percent (50%) of the time. When switch 33 is activated, such as by pushing button 123 on control unit 12, the amount of heat that is generated by the resistor array 13 is "medium". Medium heat is generated when the power transmitted to through switch 33 is permitted to be on at approximately sixty six percent (66%) of the time. When switch 34 is closed, such as by pushing button 124 on control unit 12, the amount of heat that is generated by the resistor array 13 is relatively "high". High heat is generated when the power transmitted to through switch 34 is permitted to be on at approximately one hundred percent (100%) of the time.

The microprocessor 30 also includes an "OFF" switch 36. When the "OFF" switch 36 is activated by a signal generated when pushing the "OFF" button 126 on control unit 12, the supply of power from a power source to the system 10 is terminated. To reinitiate the supply of power to the system 10 (i.e., turn the system on), any one of buttons 122–124 may be pushed to send a signal to the microprocessor 30 to activate the any one of corresponding switches 32–34.

Once any one of buttons 122–124 is pushed to turn the system 10 to "ON", the microprocessor 30 send a signal to a timing mechanism to activate an initial set time period during which the system is permitted to stay on. In one embodiment of the invention, the initial set time period is set for approximately sixty (60) minutes. During this initial set time period, the supply of power is permitted to flow to the system 10 to generate heat by way of the resistor array 16 in heating pad 13. After the expiration of the initial set time period, one of switches 32–34 is deactivated, and the "OFF" switch 32 in microprocessor 30 is activated to terminate the supply to power to the system 10. It should be appreciated that the timing mechanism may be any commercially available hardware timer, such as a timing chip. Alternatively, the microprocessor 30 may be programmed with a timer function. While the system 10 is on and the microprocessor 30 counts down the initial set time period, the level of heat generation (e.g., low, medium, high) through the activation of any one of switches 32—34 may be changed by pushing anyone of buttons 122–124 without disrupting any of the functions of the microprocessor 30, including the initial set time period. In other words, the microprocessor 30 will continue to count down the balance of the initial set time period even when the heat level is changed.

Still looking at FIG. 3, the microprocessor 30, in one embodiment of the invention, is provided with an "AUTO" switch 38. When the "AUTO" switch 38 is activated by a signal generated when pushing the "AUTO" button 128 on control unit 12, the microprocessor 30 overrides the initial set time period, and initiates a shortened time period during which the system 10 is permitted to stay on. In a preferred embodiment of the invention, the shortened time period is set for approximately twenty minutes. This shortened time period, however, can be provided with any desirable duration. It should be noted that microprocessor 30 is designed so that activation of the "AUTO" switch 38 does not disrupt the level of heat generation in the system 10. However, if during the balance of the shortened time period, the "AUTO" button 128 is again pushed, the shortened time period will be reset to the full shortened time period, for example, twenty minutes. If the "AUTO" button 128 is not pushed during the balance of the shortened time period, after the expiration of the shortened time period, the "OFF" switch 32 in microprocessor 30 is activated to terminate the supply to power to the system 10.

As a convenience to the user, an indicating mechanism may be provided on control unit 12 to indicate to the user whether the system 10 is in initial set time period mode (i.e., 60 minutes) or whether the system 10 is in shortened time period mode (i.e., 20 minutes). In one embodiment of the invention, light emitting diodes (LED) may be used, so that the microprocessor 30 may send a signal to, for example, a red LED as an indication that the system is in the initial set time period mode, or a green LED as an indication that the system is in the shortened time period mode. Of course, other indicating mechanisms or displays available in the art may also be used.

Figure 4:
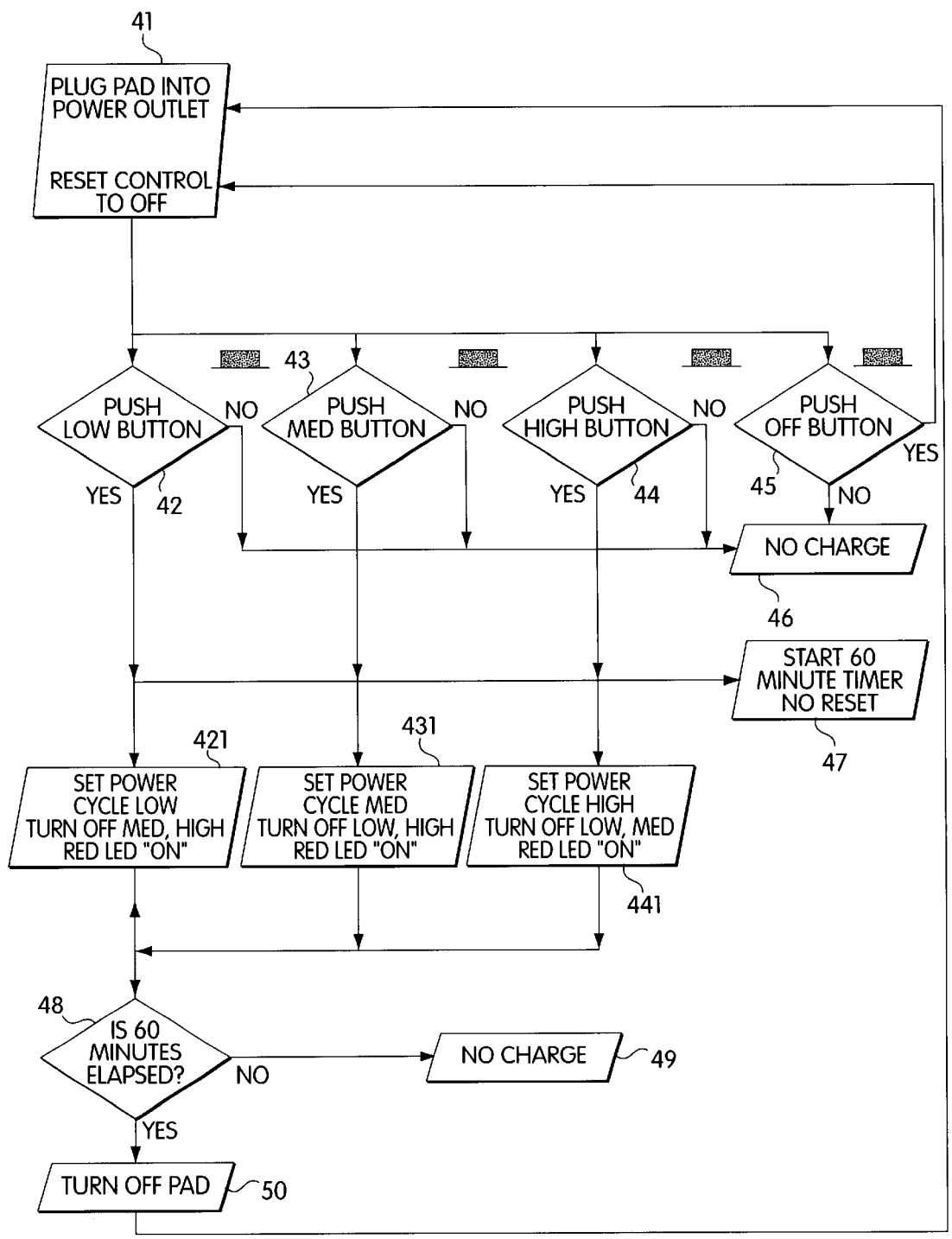
FIG. 4 illustrates a control logic used by the microprocessor of FIG. 3 in connection with one timing mode of the present invention.

Reference is now directed to FIG. 4, which illustrates one control logic embodiment used by the microprocessor 30 in supplying power and timing mode to the system 10. In the embodiment shown in FIG. 4, when the system 10 is first connected to an electrical outlet, the "OFF" switch 36 is reset to "off" in step 41. The microprocessor 30 then checks to see whether any of the switches 32—34 has been activated. Activation of any of the switches 32—34 turns the system 10 "on".

If switch 32 is activated by pushing button 122, as shown in step 42, then the microprocessor 30 sends a signal to the timing mechanism, in step 47, to start an initial set time period. The duration of the initial set time period, in one embodiment, is approximately sixty minutes. The microprocessor 30 also sends a signal to the power supply 11, in step 421, for selection of the appropriate voltage output which, in this case, corresponds to low heat level generation in the resistor array 16 in heating pad 13. If switch 32 is not activated, then the microprocessor 30 makes no change to the system 10, as shown in step 46.

If switch 33 is activated by pushing button 123, as shown in step 43, then the microprocessor 30 sends a signal to the timing mechanism, in step 47, to start an initial set time period. The microprocessor 30 also sends a signal to the power supply 11, in step 431, for selection of the appropriate voltage output which, in this case, corresponds to medium heat level generation in the resistor array 16 in heating pad 13. If switch 33 is not activated, then the microprocessor 30 makes no change to the system 10, as shown in step 46.

If switch 34 is activated by pushing button 124, as shown in step 44, then the microprocessor 30 sends a signal to the timing mechanism, in step 47, to start an initial set time period. The microprocessor 30 also sends a signal to the power supply 11, in step 441, for selection of the appropriate voltage output which, in this case, corresponds to high heat level generation in the resistor array 16 in heating pad 13. If switch 33 is not activated, then the microprocessor 30 makes no change to the system 10, as shown in step 46.

It should be noted that in steps 421, 431 and 441, when one of switches 32—34 is activated, an "on" signal is sent by the microprocessor 30 to, for example, a red LED to indicate that the system 10 is in an initial set time period mode. The other two of switches 32—34 are deactivated.

The microprocessor 30 also checks to see whether the "OFF" switch 36 has been activated in step 45. If while the system 10 is "on" and the "OFF" switch 36 is activated by pushing button 126, then the microprocessor 30 returns to step 41 to reset the "OFF" switch 36 to "off". If the "OFF" switch 36 is not activated, then the microprocessor 30 makes no changes to the current status of the system 10, as shown in step 46.

Once the system is "on", the microprocessor 30 periodically checks the timing mechanism to determine whether the initial set time period has elapsed in step 48. If the initial set time period has not elapsed, the microprocessor 30 makes no changes to the current status of the system 10, as depicted in step 49. If, on the other hand, the initial set time period has elapsed, then the microprocessor 30 sends a signal to the "OFF" switch 36 to terminate the supply of power to the system 10 in step 50 and returns to step 41.

Figure 5:
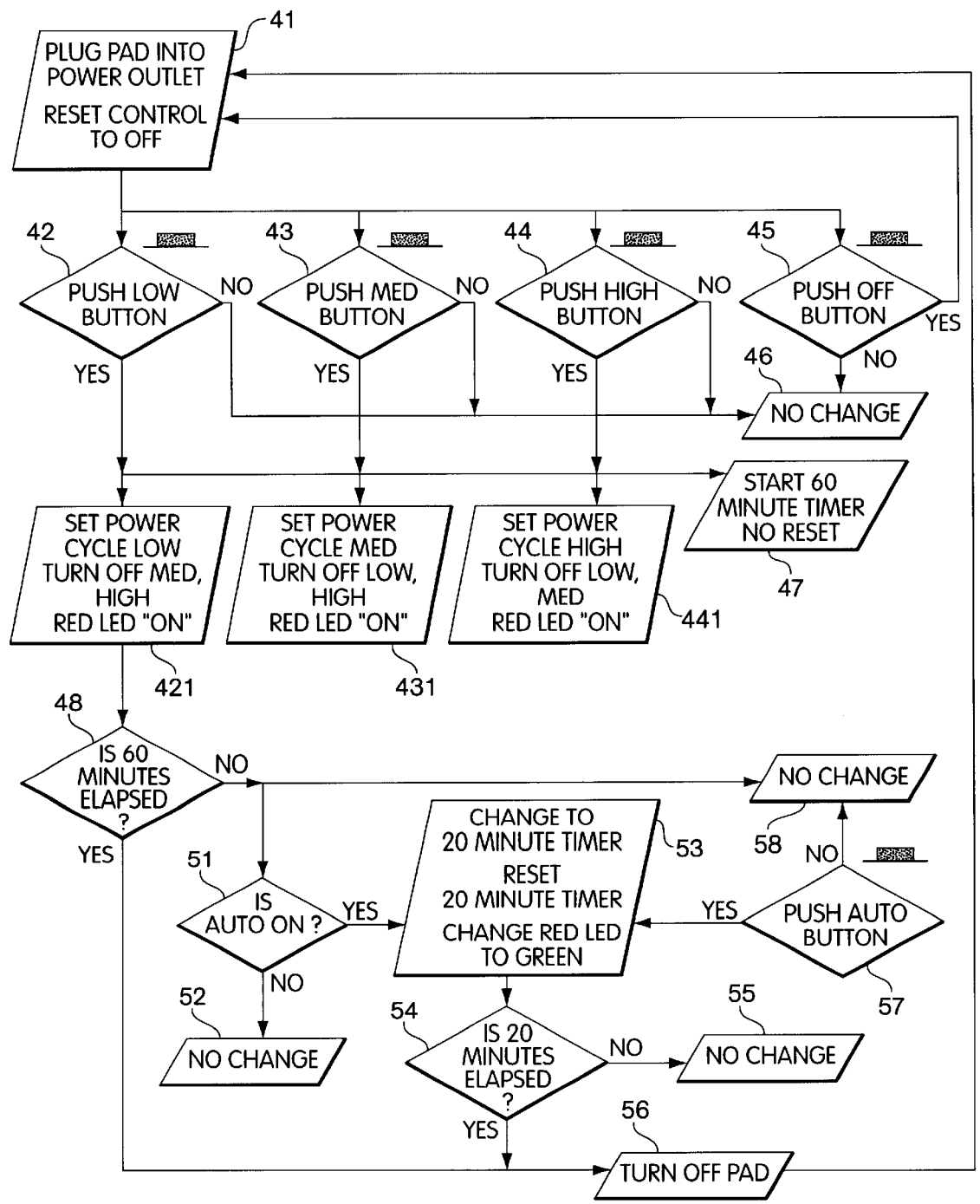
FIG. 5 illustrates a control logic used by the microprocessor of FIG. 3 in connection with another timing mode of the present invention.

In an embodiment where the system 10 is equipped with "AUTO" button 128, then the control logic embodiment shown in FIG. 5 is utilized by the microprocessor 30 when supplying power and timing mode to the system 10. The control logic embodiment shown in FIG. 5 differs from the control logic of FIG. 4 beginning with step 51. After checking the timing mechanism to determine whether the initial set time period has elapsed in step 48, the microprocessor 30 checks to see whether the "AUTO" switch 38 has been activated in step 51. Activation of the "AUTO" switch 38 is accomplished by pushing "AUTO" button 128. If the "AUTO" switch 38 is not activated, then the microprocessor 30 makes no changes to current status of the system 10, as indicated in step 52. In other words, the microprocessor 30 continues to operate under the initial set time period mode (i.e., the 60 minute mode). If the "AUTO" switch 38 is activated, the microprocessor 30 sends a signal to the timing mechanism to deactivate the initial set time period and to initiate the shortened time period in step 53. The shortened time period, in one embodiment, may be controlled by a timing chip separate from the timing chip which controls the initial set time period. Alternatively, the microprocessor 30 may be programmed with a shortened period timer function. The shortened time period, in a preferred embodiment has a duration of approximately twenty minutes. The microprocessor 30 also sends an "off" signal to the red LED and an "on" signal to, for example, a green LED to indicate that the system 10 is in a shortened time period mode.

Once in the shortened time period mode, the microprocessor 30 periodically checks the timing mechanism to determine whether the shortened time period has elapsed in step 54. If the shortened time period has not elapsed, the microprocessor 30 makes no changes to the current status of the system 10, as illustrated in step 55. If, on the other hand, the shortened time period has elapsed, then the microprocessor 30 sends a signal to the "OFF" switch 36 to terminate the supply of power to the system 10 in step 56 and returns to step 41.

If during the balance of the shortened time period, the "AUTO" button 128 is pushed, such as that shown in step 57, the microprocessor 30 sends a signal to the timing mechanism to reset it to a full shortened time period, which in this case, is about twenty minutes. The "AUTO" button 128 may be pushed as often as it is desired by the user to permit precise time management in the generation of heat by the resistor array 16 in heating pad 13. Each time the "AUTO" button 128 is pushed, the "AUTO" switch 38 is activated, and this can continue on indefinitely, so long as the system 10 is "on". If, on the other hand, the "AUTO" button 128 is not pushed, the microprocessor 30 makes no changes to the current status of the system 10, and the balance of the shortened time period is permitted to run out. Once the shortened time period has elapsed, the supply of power to the system 10 is terminated.

While the invention has been described in connection with the specific embodiments thereof, it will be understood that it is capable of further modification. For example, should a mechanism for permitting the user to variably set the timing period during which the system is on is desirable, the control unit 12 of the present invention, as well as the microprocessor 30, can be easily adapted to accommodate such a variable timing mechanism. Moreover, should it be desirable to permit specific temperature setting, the control unit 12 can be provided with such a setting control and the microprocessor 30 can be correspondingly modified to permit such temperature generation. Furthermore, this application is intended to cover any variations, uses, or adaptations of the invention, including such departures from the present disclosure as come within known or customary practice in the art to which the invention pertains, and as fall within the scope of the appended claims.

What is claimed is:

1. A system for controlling power applied to a heating pad, the system comprising:
    a power supply for connection to a power source;
    a control unit connected to the power supply and having:
        (a) a timer device for generating an initial set time period during which power is supplied to the system; and
        (b) input mechanisms for (i) selecting an amount of heat to be output by the heating pad, (ii) terminating the supply of power to the system prior to expiration of the initial set time period generated by the timer device, and (iii) initiating a shortened time period in place of the initial set time period, after which shortened time period the supply of power from the power supply is automatically terminated; and
    a resistor array positioned within the heating pad and connected to the control unit for generating heat based on the selected amount from the control unit.

2. A system as set forth in claim 1, wherein the power supply, in response to the control unit, produces a power level which sufficiently corresponds to the selected amount of heat to be output by the heating pad.

3. A system as set forth in claim 1, wherein the control unit includes a microprocessor for controlling the duration and supply of power to the resistor array.

4. A system as set forth in claim 1, wherein the timer device is designed so that at the expiration of the initial set time period, the supply of power from the power supply is automatically terminated.

5. A system as set forth in claim 4, wherein the initial set time period is approximately sixty minutes.

6. A system as set forth in claim 1, wherein the mechanism, after an elapsed period, resets the shortened time period to its full duration each time the mechanism is activated.

7. A system as set forth in claim 6, wherein the shortened time period is approximately twenty minutes.

8. A system as set forth in claim 1, wherein the input mechanism for selecting the amount of heat includes a plurality of buttons, each representing a different level of heat output.

9. A system as set forth in claim 8, wherein activation of one of the buttons initiates the supply of power to the system.

10. A system as set forth in claim 1, wherein the input mechanism for selecting the amount of heat includes a sliding element for selection of different levels of heat output.

11. A system as set forth in claim 10, further including an input mechanism to initiate the supply of power to the system.

12. A system as set forth in claim 1, wherein the control unit further includes an indicator to indicating whether the system is operating in an initial set time period or a shortened time period.

13. A system for controlling power applied to a heating pad, the system comprising:
    a power supply for connection to a power source;
    a control unit connected to the power supply and operable in an initial set time period mode, or a shortened time period mode, which shortened time period mode can be activated to override the initial set time period mode, the control unit having an input mechanism for selecting an amount of heat to be output by the heating pad and a mechanism for activating the shortened time period mode; and
    a resistor array positioned within the heating pad and connected to the control unit for generating heat based on the selected amount from the control unit.

14. A system as set forth in claim 13, further including a mechanism for terminating the supply of power to the system prior to the expiration of either the initial set time period mode or the shortened time period mode.

15. A system as set forth in claim 14, wherein the mechanism, after an elapsed period, resets the shortened time period to its full duration each time the device is activated.

16. A system for controlling power applied to a heating pad, the system comprising:
    a power supply for connection to a power source;
    a control unit connected to the power supply and having:
        (a) a timer device for generating one of an initial set time period and a shortened time period during either of which period power is supplied to the system; and
        (b) an input mechanism for selecting an amount of heat to be output by the heating pad and a mechanism for activating the shortened time period; and
    a resistor array positioned within the heating pad and connected to the control unit for generating heat based on the selected amount from the control unit.

17. A system as set forth in claim 16 further including an input mechanism for terminating the supply of power to the system prior to expiration of either of the initial set time period or the shortened time period.

18. A system as set forth in claim 16, wherein the control unit includes a microprocessor for controlling the duration and supply of power to the resistor array.

19. A system as set forth in claim 16, wherein the control unit includes a mechanism which resets the shortened time period to its full duration, after an elapsed period, each time the mechanism is activated.

20. A system as set forth in claim 16, wherein the input mechanism for selecting the amount of heat includes a plurality of buttons, each representing a different level of heat output.

21. A system as set forth in claim 20, wherein activation of one of the buttons initiates the supply of power to the system.

22. A system as set forth in claim 16, wherein the input mechanism for selecting the amount of heat includes a sliding element for selection of different levels of heat output.

23. A system as set forth in claim 22, further including an input mechanism to initiate the supply of power to the system.

24. A system as set forth in claim 16, wherein the control unit further includes an indicator to indicating whether the system is operating in an initial set time period or a shortened time period.

25. A method for controlling power to a resistor array, the method comprising:

selecting an amount of power to be applied to the resistor array;

initiating an initial set time period during which power is supplied to the resistor array;

transmitting the selected amount of power to the resistor array;

causing the resistor array to generate a heat level corresponding to the amount of power transmitted thereto; and initiating a shortened time period in place of the initial set time period, after which power transmitted to the resistor array is terminated.

26. A method as set forth in claim 25, further including terminating the power supplied to the resistor array at the expiration of the initial time period.

27. A method as set forth in claim 25, wherein step initiating a shortened time period includes resetting the shortened time period upon command.

28. A method of controlling power applied to a resistor array, the method comprising:

(a) providing a system having:
      a power supply for connection to a power source;
      a control unit connecting to the power supply to the resistor array and having:
         (a) a timer device for generating an initial set time period during which power is supplied to the system; and
         (b) input mechanisms for (i) selecting an amount of heat to be output by the resistor array, and (ii) terminating the supply of power to the system prior to expiration of the initial set time period generated by the timer device; and (b) operating the input mechanisms to select the level of heat to be output;

(c) initiating an initial set time period during which power is supplied to the system;

(d) causing the power supply to generate power equivalent to the level of heat selected by the input mechanism;

(e) transmitting the generated power to the resistor array;

(f) causing the resistor array to produce a heat level corresponding to the amount of power transmitted thereto; and (g) causing the timer device to initiate a shortened time period in place of the initial set time period, after which power transmitted to the resistor array is terminated.

29. A method as set forth in claim 28, further including terminating the power transmitted to the resistor array at the expiration of the initial set time period.

30. A method as set forth in claim 18, wherein step initiating a shortened time period includes resetting the shortened time period upon command.

31. A method of controlling power applied to a resistor array, the method comprising:

(a) providing a system having:
      a power supply for connection to a power source;
      a control unit connected to the power supply to the resistor array and having:
         (a) a timer device for generating one of an initial set time period and a shortened time period during either of which period power is supplied to the system; and
         (b) an input mechanism for selecting a level of heat to be output by the resistor; and (b) operating the input mechanisms to select the level of heat to be output;

(c) initiating an initial set time period during which power is supplied to the system;

(d) causing the power supply to generate power equivalent to the level of heat selected by the input mechanism;

(e) transmitting the generated power to the resistor array;

(f) causing the resistor array to produce a heat level corresponding to the amount of power transmitted thereto; and (g) causing the timer device to initiate a shortened time period in place of the initial set time period, after which power transmitted to the resistor array is terminated.

32. A method as set forth in claim 31, further including terminating the power transmitted to the resistor array at the expiration of the initial set time period.

33. A method as set forth in claim 31, wherein step initiating a shortened time period includes resetting the shortened time period upon command.

\* \* \* \* \*